Figure 4:
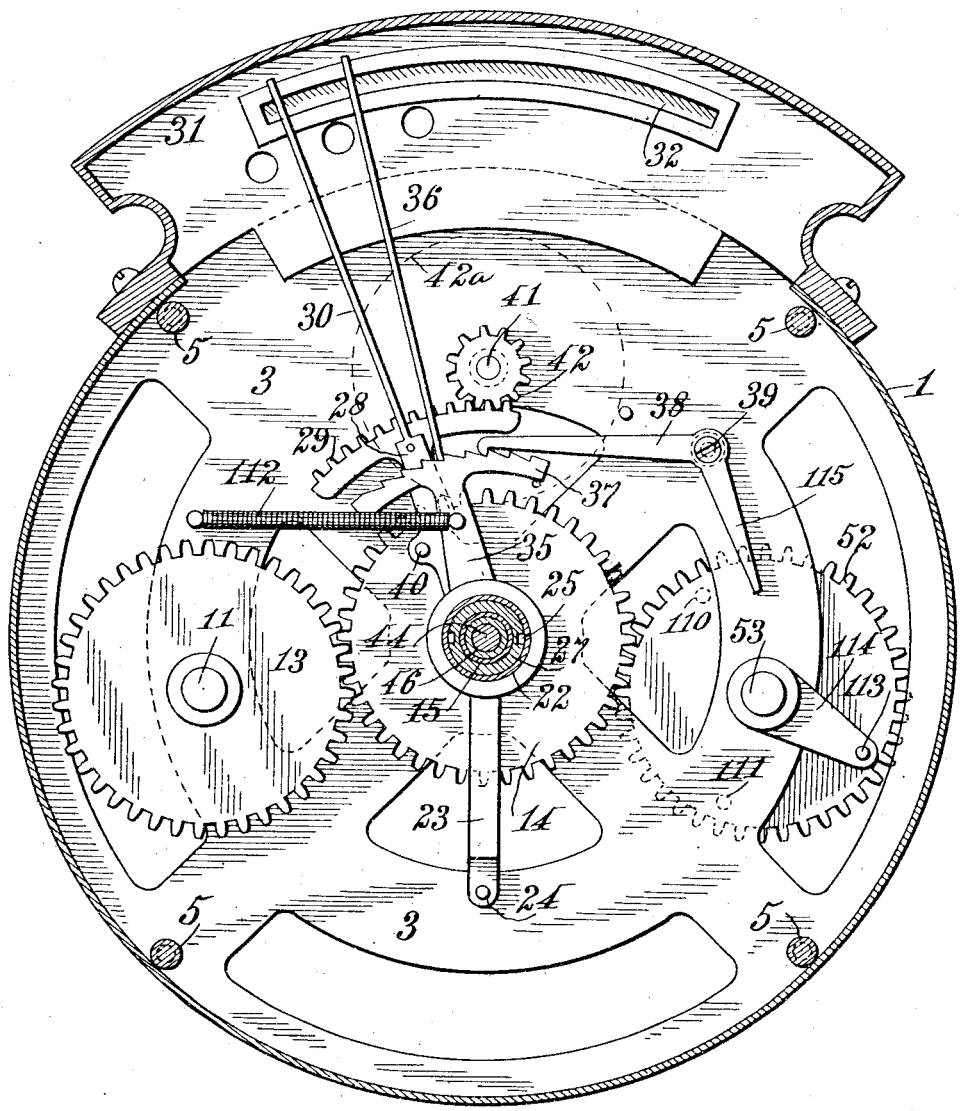

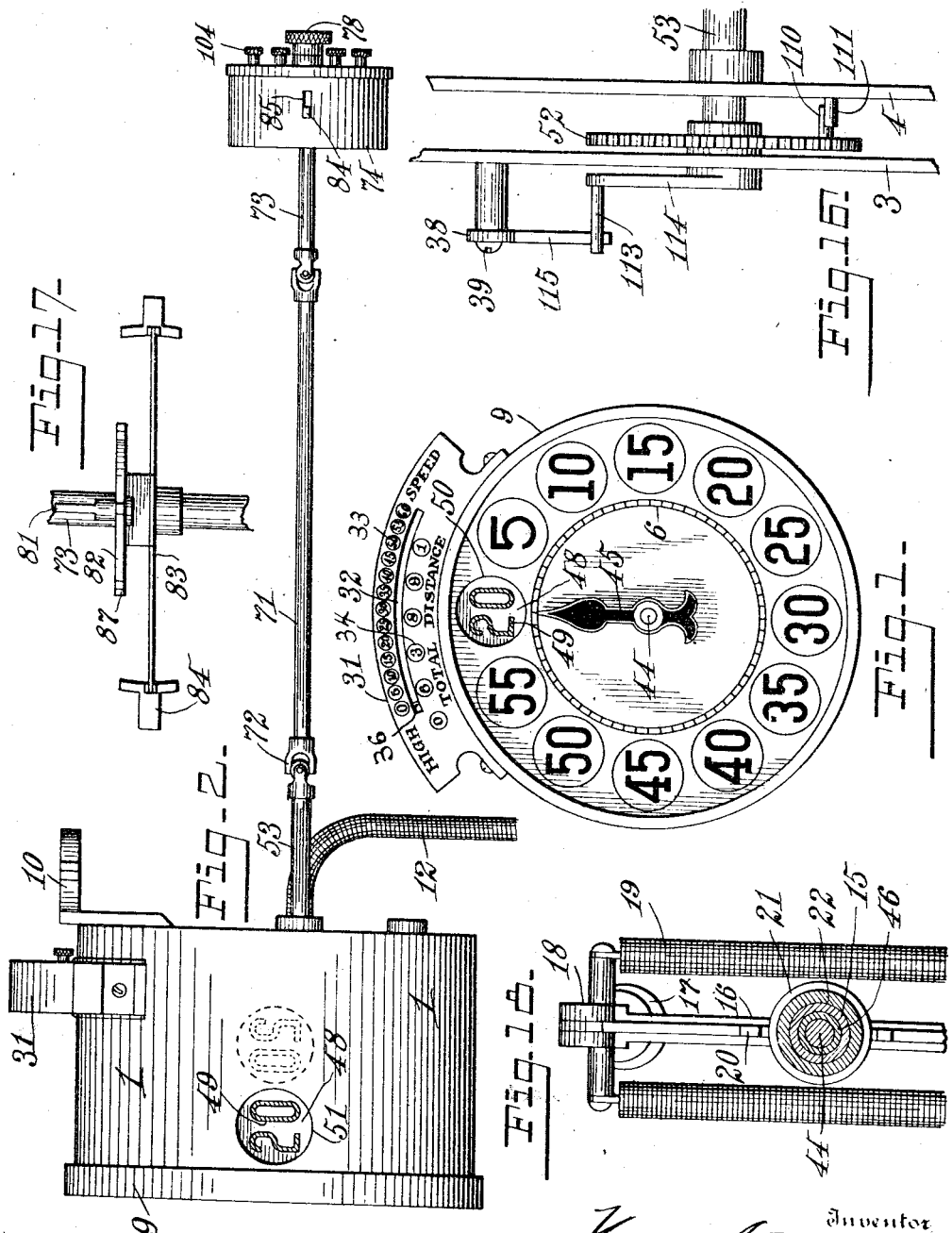

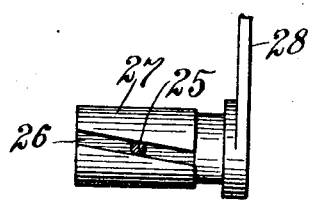

T. A. SAMMONS.
SPEED REGULATING AND CONTROLLING DEVICE.
APPLICATION FILED JUNE 4, 1915.

1,181,260.

Patented May 2, 1916.
5 SHEETS—SHEET

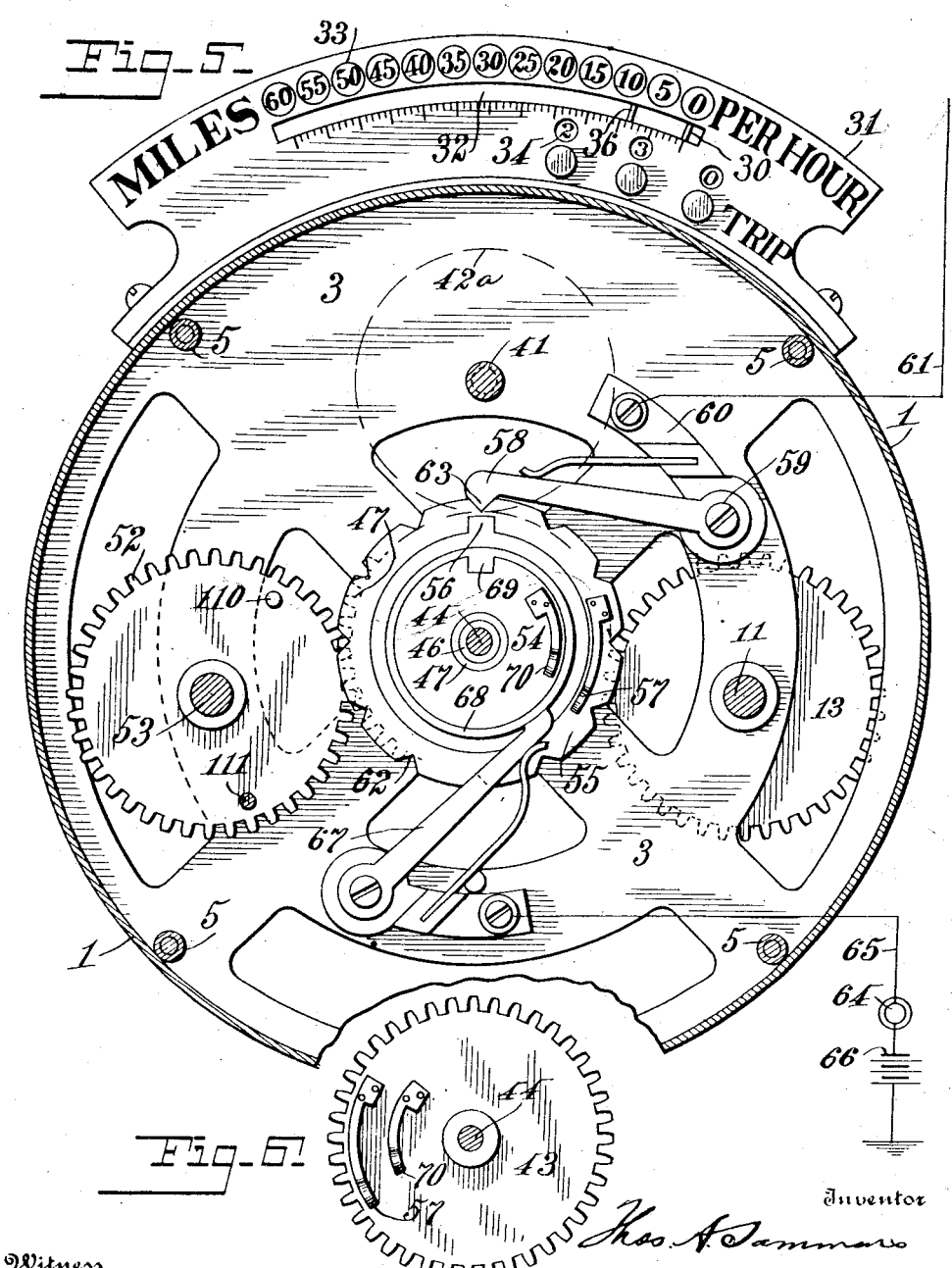

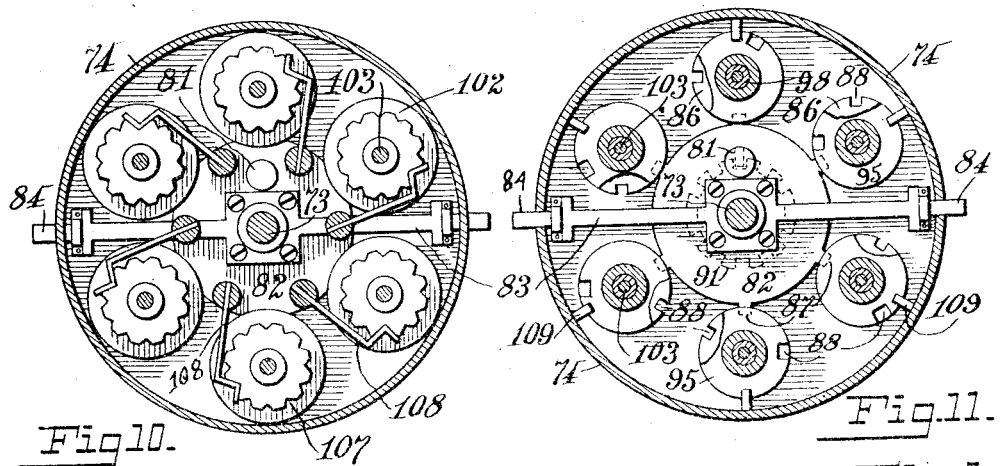
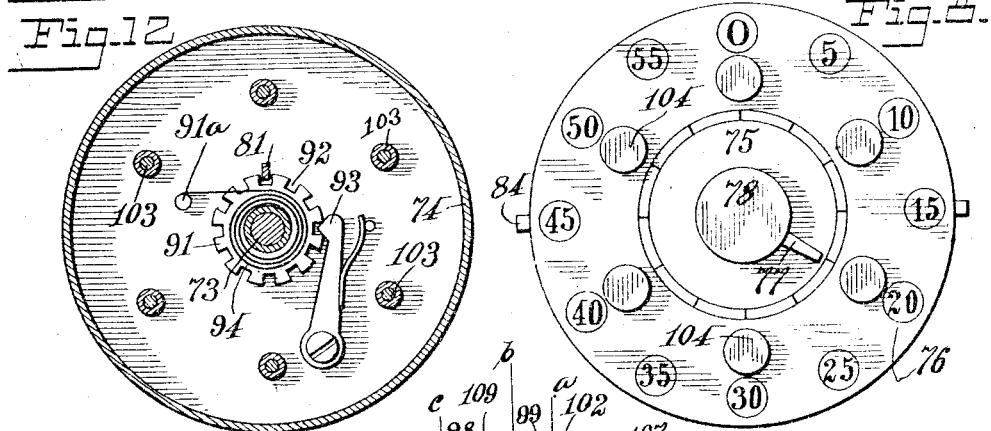
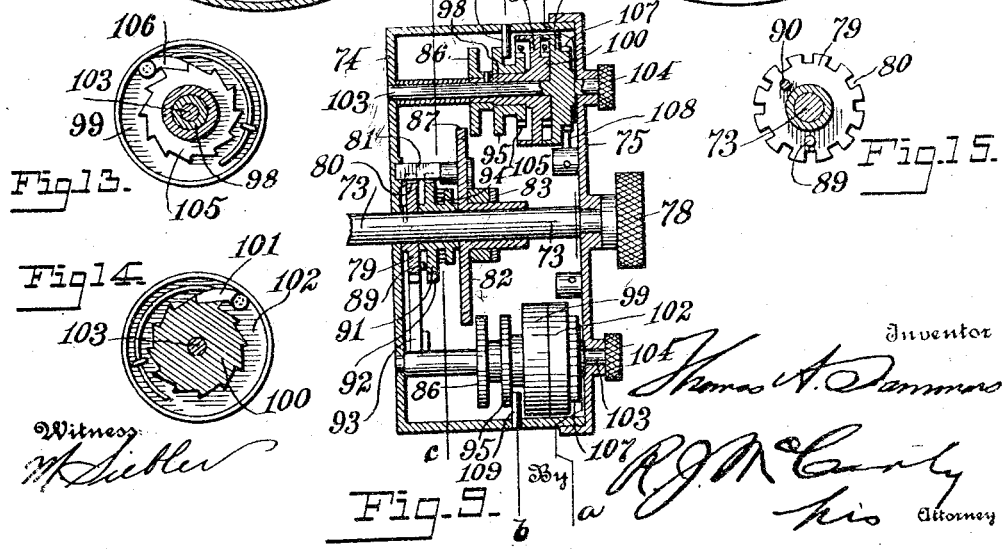

UNITED STATES PATENT OFFICE.

THOMAS A. SAMMONS, OF DAYTON, OHIO.

SPEED REGULATING AND CONTROLLING DEVICE.

1,181,260.　　　Specification of Letters Patent.　　Patented May 2, 1916.

Application filed June 4, 1915. Serial No. 32,227.

*To all whom it may concern:*

Be it known that I, THOMAS A. SAMMONS, a citizen of the United States, residing at Dayton, in the county of Montgomery and State of Ohio, have invented certain new and useful Improvements in Speed Regulating and Controlling Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to speed regulating and controlling mechanisms for motor-driven vehicles, more particularly automobiles, motor-trucks and motorcycles. Owing to the new uses and purposes which the mechanism is designed to subserve, it may appropriately be termed a safetometer.

The invention provides way and means for publicly ascertaining and controlling the speed of motor-driven vehicles, such as mentioned above, whereby laws and ordinances enacted in the interest of public safety may be made practicable and effective. Such laws at the present time are practically inoperative and useless owing to the lack of effective means for compelling their observance on the part of the drivers of motor-propelled vehicles.

It is the main object of the present invention to provide effective and practicable means for regulating the speed of vehicles of the character named in a more convenient and satisfactory manner than is possible with the present method of placing watchmen at given distances apart, provided with stop watches, for the purpose of ascertaining the speed of such vehicles.

The invention comprises means by which the driving power of a vehicle will be automatically shut off when the speed, as shown by an indicator, has reached the highest point to which the controlling mechanism has been previously set, it being understood that some person in authority had previously set the indicating and controlling mechanisms to some particular rate of speed. For example, were the controlling mechanism to be set to a speed of say twenty miles an hour, when the speed indicator hand reached that figure, the power would be instantaneously shut off and the speed of the vehicle correspondingly reduced, it being a mechanical impossibility for the vehicle to attain a higher speed than that at which the indicating and controlling mechanisms are set.

A further object of the invention is to provide means for locking the indicating and controlling mechanisms at any desired point, from sixty miles an hour, for example, to a stand still position. The importance of this feature will be readily recognized, as it prevents a theft of the vehicle or its use by unauthorized persons, while enabling the owner thereof to maintain absolute out-of-sight control over the driver or chauffeur who might, as is too often the case, be possessed of the speed mania, and thereby relieving the proprietor of a heavy responsibility.

A further object of the invention is to provide means by which municipal authorities may, in the interest of public safety, assume absolute control of the speed of any or all motor-driven vehicles. The value of this feature is almost beyond estimation, as in the event of a too frequent abuse of less drastic regulations. The offender may be hobbled, so to speak, by having his vehicle locked out by order of the proper authorities at such rate of speed as in their judgment the offender should be allowed to run.

These and other objects incidental thereto will appear from the following description of my invention in detail. Preceding such description, reference is made to the accompanying drawings as follows:

Figure 1 is a front elevation showing the main speed indicating dial, also the indicator drum in a position to indicate the maximum rate of speed to which the speed-controlling mechanism is set, and the usual odometer and speedometer indications denoting the total distances and speed. Fig. 2 is a side elevation of the casing in which is inclosed the speed indicating and controlling mechanism and the casing inclosing the lockout mechanism with suitable connections between said respective mechanisms. Fig. 3 is a longitudinal sectional elevation of the speed-indicating mechanism and speed-controlling mechanism. Fig. 4 is a sectional elevation on the line *x—x* of Fig. 3 looking in the direction of the arrow. Fig. 5 is a sectional elevation on the line *y—y* of Fig. 3 looking in the direction of the arrow. Fig. 6, Sheet 4, is a detail view of the gear wheel which controls the movement of the front or main indicator hand, and supports the brushes or contact springs controlling the connections with the electric circuit. Fig. 7, Sheet 3, is a detail view of a slidable sleeve, controlled by the governor, and adapted to actuate the entire speed indicating mechanism. Fig. 8, Sheet 5, is a front elevation of the housing of the lookout or speed-controlling mechanism showing the hand knob, indicator hand, indications of the rate of speed to which the controlling mechanism may be set, and thumb knobs for setting the combination of the locking members. Fig. 9, Sheet 5, is a sectional view of Fig. 8, showing the combination and locking mechanism which holds the vehicle down to the speed to which the controlling mechanism is set. Fig. 10, Sheet 5, is a sectional view on the line $a$—$a$ of Fig. 9. Fig. 11, Sheet 5, is a sectional view on the line $b$—$b$ of Fig. 9. Fig. 12, Sheet 5, is a sectional view on the line $c$—$c$ of Fig. 9. Figs. 13 and 14, Sheet 5, are detail views of the ratchets through which the combinations are changed and the tumblers held in set position. Fig. 15, Sheet 5, is a detail view of one of the locking members coöperating with the bolt in controlling the indicator which indicates the speed to which the vehicle has previously been set to run, also serving the purpose of locking the vehicle in a stand-still position. Fig. 16, Sheet 1, is a detail view of the trip arm and allied parts through means of which the speedometer or high speed indicator hand is released from an arrested or hooked-up position. Fig. 17, Sheet 1, is a detail view of the means for shifting the combination-locking bolt. Fig. 18, Sheet 1, is a detail view of the speed-controlling device.

Throughout the specification and drawings, similar reference characters indicate corresponding parts.

A suitable casing 1 houses the various speed-controlling and indicating mechanisms, and a suitable casing 74 houses the combination setting and locking mechanisms, all hereinafter fully described. As is shown in Fig. 2, the mechanisms of these respective casings are connected by suitable connections. Mounted within the casing 1 is a front frame 2, a middle frame 3 and a rear frame 4 which are connected by suitable means such as set bolts 5 running transversely from front to back. The front frame 2 is provided with a dial 6 which is covered by a crystal 7 held in position by a ring 8 and a flanged ring 9. The casing and the parts supported therein are conveniently mounted upon an automobile or motor-driven car in the front of the radiator (not shown) by means of any suitable device, such as a clamp 10 which may be connected to the filling spout of the radiator. Journaled in the frames 3 and 4 is a driving-shaft 11 to which is attached a flexible shaft 12 which is in turn geared to the right front wheel of the vehicle. The shaft 11, therefore, rotates at a speed commensurate with the speed of the automobile. Mounted on the shaft 11 is a gear 13 which meshes with a gear 14 secured to a sleeve 15 journaled on a sleeve 46 between the frames 2 and 3. On the end of the sleeve 15 opposite the gear 14, there are mounted arms 16 to which fly-balls 17 are pivoted at 18. The fly-balls 17 are normally controlled by springs 19 which are suitably connected therewith. The force of the springs 19 counteracts the centrifugal force of the rotating fly-balls 17. The position or extent of movement of the fly-balls 17 relative to the axis of the sleeve 15 will be in accordance with the speed of the automobile. The said fly-balls are suitably connected to segment gears 20 which mesh with annular gear teeth 21 on a reciprocating but non-rotatable sleeve 22. The sleeve 22 is mounted on the sleeve 15 and is prevented from being rotated by an arm 23 secured thereto and slidable on a pin 24 extending from the frame 3. When the fly-balls 17 oscillate on their pivots 18, it is apparent that the sleeve 22 will be reciprocated concurrently therewith and in proportion to the movement thereof. The sleeve 22 is provided with inwardly projecting pins 25 which ride in helical slots 26 in an oscillating sleeve 27 journaled on the sleeve 15, as shown in Figs. 4 and 7. Attached to one end of the sleeve 27 is an arm 28 carrying a segment gear 29 and an indicating hand 30, which may be seen by the driver of the machine. The indicating hand 30 projects into a housing 31 mounted on the top of the casing 1, the said housing 31 being provided with sight openings or windows 32 through which the hand 30 is visible. Calibrations 33 are placed adjacent to said openings and are readable in connection with the hand 30 to indicate to the driver the speed at which the vehicle is traveling. The housing 31 is also provided with sight openings or windows 34 through which the indications of a trip and total distance odometers are viewable, but which form no part of the present invention as these devices may be of any well known type. Freely journaled on the sleeve 27 is an arm 35 provided with an indicating hand 36. The arm 35 is provided with a ratchet segment 37 adapted to be engaged by a pawl 38 pivoted at 39 to the frame 3. The arm 35 is actuated by the arm 28 through the agency of a pin 40 on said arm 28 and with which it is normally in engagement. When the arm 28 is actuated by the fly-balls 17, the pin 40 will move the arm 35 and therewith the hand 36 to the position denoting the highest speed attained by the automobile and in which position said hand 36 will be held by the pawl 38 until subsequently released, as will be hereinafter described. The hand 36 is instrumental in indicating the highest speed attained by the automobile during any particular time or trip. The segment gear 29 is in mesh with a pinion 42 mounted on a shaft 41 journaled in the frames 3 and 4. Also mounted on the shaft 41 is a gear 42ª in mesh with a gear 43 attached to one end of a shaft 44 mounted in the sleeve 46. The gear 43 is an important element in that it imparts movement to the main indicator hand through the shaft 44 and also supports the brushes through which the electric circuit is controlled. On the end of the shaft 44 opposite the gear 43, is the main indicator hand 45 which operates in connection with the dial 6 to indicate the speed of the automobile. The dial 6 and hand 45 are of such a size that the speed of the automobile will be indicated to persons at a considerable distance and others than passengers in the car.

The means for preventing the car attaining a higher speed than the rate determined by some one having authority, is as follows: The sleeve 46 to which reference has been made has a gear 47 attached to it which gear carries an insulating disk 54. Also mounted on the sleeve 46 is a drum 48 provided with indications 49 which are viewable at the front through an opening 50 and at the side through openings 51. The indications on said drum viewable through the openings 50 and 51 designate the speed limit to which the device is set. The said speed limit indicator drum 48 is rotated by means of a gear 52 mounted on a shaft 53 journaled in the frames 3 and 4. The gear 52 meshes with gear 47 on sleeve 46. The means for rotating the shaft 53 will be hereinafter described.

The means for rendering the automobile inoperative when the machine passes the speed limit to which it has been set is as follows: The insulation disk 54, mounted, as before stated, on the gear 47, is provided with a conductor ring 55, having a pocket 56 which receives an extension of said insulation disk 54. Adapted to press against the conductor ring 55 is a brush 57 carried by the gear 43. The said brush 57 forms the ground end of the sparking circuit of the automobile. The circuit is completed by the brush 57 through the agency of a pawl 58 pivoted at 59 to an insulated block 60. The said pawl 58 is provided with a lead wire 61 which is connected into the sparking circuit. When the said brush 57 is in engagement with the conductor ring 55, the sparking circuit will be completed but when said brush 57 rides upon the insulation in the pocket 56, the sparking circuit will be broken and thus the automobile will be rendered inoperative.

It is to be understood that the present illustration shows the device as connected into the ignition circuit of an automobile. The collector ring 55 is provided with a plurality of recesses 62 which receive the nose 63 of the pawl 58 which is instrumental in holding the collector ring 55 in any one of its set positions. The space between any two of the recesses 62 represents a speed variation of five miles. As shown in the drawings, Figs. 1 and 2, the instrument is set to a speed limit of twenty miles and it will be seen that when the fly-balls 17 are revolved to an extent corresponding in velocity to a speed of twenty miles an hour, the brush 57 will ride upon the insulation disk 54 extending into the pocket 56, thereby breaking the electric circuit. To indicate to the driver when he is approaching the speed limit, an audible indicator in the form of a buzzer 64 is provided in an electrical circuit 65 one end of which is grounded through a battery 66 and the other end of which is connected to a brush 67 which is carried on the gear 43 and in engagement with a collector ring 68 mounted on the insulation disk 54. The collector ring 68 is provided with an offset 69 adapted to be engaged by the inner brush 70 prior to the time the car reaches the speed limit. The brush 70, like the brush 57, is mounted on the gear 43 and is normally in engagement with the insulation disk 54 thereby normally maintaining an open circuit through the buzzer 64 and the battery 66. The brushes 57 and 70 are for convenience illustrated in Fig. 5 as being free from the gear 43, but it will be borne in mind that the said brushes are carried by said gear, as appears in Fig. 6.

The means for setting the speed limit indicating drum 48 and the insulation disk 54 is as follows, as shown in Fig. 2: Connected to a shaft 53 by means of an intermediate flexible shaft 71 and universal joints 72 is a shaft 73 which is journaled in the casing 74 having a front plate 75. The casing 74, for example, is conveniently mounted on the dash of the automobile and the front plate 75 thereof is provided with a dial face 76 which is read in connection with a hand 77 extending from a finger knob 78 on one end of said shaft 73. By rotating the knob 78 and reading from the hand 77, the position desired for the indicating drum 48 and insulation disk 54 may be determined. It will now be noted that when the drum 48 is set to indicate zero through the front and side openings 50 and 51 in the casing 1, the outer brush 57 will be in engagement with the insulation in the pocket 56, thereby rendering the vehicle inoperative; and it is to be further understood that in this position the insulation disk 54 will also be in engagement with the inner brush 70, thereby maintaining an open or broken circuit for the buzzer 64.

The setting mechanism just described may be locked in the above position by means of a permutation lock as now described. This lock is instrumental in locking the vehicle in a stand-still position and to such maximum rate of speed as may be determined upon, at one and the same time, and to this end said lock is necessarily composed of two sets of combination ratchets and tumblers operated by the same thumb knobs but capable of being set to two separate and distinct combinations, one for what may be termed the high speed and the other for a stand-still position. For example, the vehicle may be locked to a maximum speed of twenty miles an hour under the high speed combination of say 84.537, and to a stand-still position under the low speed combination of say 374.552. By such provision it will be seen that the vehicle may be locked or unlocked to or from an inoperative position by setting the combination 374.552 independent of the vehicle being locked to any particular maximum rate of speed under combination 84.573, and it is further obvious that without a knowledge of the high speed combination the vehicle can be operated at no higher speed than that to which it may be locked out. This renders it possible for the proprietor or the authorities to maintain absolute control of the vehicle by setting and locking it to whatever rate of speed it may be desired the vehicle should run.

The foregoing results are achieved as follows, as shown on Sheet 5: Mounted on the setting shaft 73 within the casing 74 is a disk 79 provided with a plurality of recesses 80 which coöperate with a spring-controlled pawl 93 to hold said disk 79 in any particular set position. Any one of the recesses 80 may receive a locking bolt 81 secured to a disk 82 slidably mounted upon the shaft 73. When the bolt 81 lies within any one of said recesses 80, the knob 78 is prevented from being rotated. The disk 82 carrying the bolt 81 is moved along the shaft 73 to remove the bolt 81 out of any of the recesses 80 by resilient arms 83 provided with finger pieces 84 which extend through openings 85 in the side of the casing 74. The disk 79 is normally locked by the bolt 81 within one of the recesses 80, held in position by tumblers 86, which are adapted to engage projections 87 on the disk 82. The tumblers 86 are each provided with a recess 88 which permits the disk 82 to be shifted when the combination tumblers are properly set. When the combination of the tumblers 86 is properly set, the said disk 82 can then be shifted to an extent sufficient to permit the bolt 81 to release the disk 79, thereby permitting the insulated pocket 56 in the disk 54 to be advanced from engagement with the brush 57 which in turn permits the vehicle to be operated or driven. At this time, the drum 48 may also be set to indicate whatever speed the operator may have determined upon. The disk 91, which is the speed limit disk, is similar in construction to the disk 79 and is provided with recesses 92 similar to recesses 80 on disk 79. The said disk 91 is freely mounted on the shaft 73 and is held in a set or locked position by the bolt 81 in the same manner as is the disk 79 but, unlike the disk 79 which is rigidly mounted on shaft 73, it is actuated in its forward movement by a pin 89 on the disk 79 which engages a pin 90 on said disk 91 and is returned to a normal position by a spiral spring 94 fastened at one end to the disk 91 and at the other end to a pin 91ª on the rear wall of the casing 74. In Fig. 15 the pin 90 is shown in the path of the pin 89 on the disk 79. When it is desired to lock or unlock the disk 91, the process of locking and unlocking the disk 79 is repeated only a different set of combination tumblers being used, the tumblers 95 being brought into play. When the combination of the tumblers 95 are properly set, the bolt-carrying disk 82 may be moved along the shaft 73 to an extent which will permit the bolt 81 to enter or be removed from the recess 92 in the disk 91. When the disk 91 is in an unlocked position, it may be set by rotating the knob 78, the said disk 91 being actuated by the disk 79 through the agency of the pins 89 and 90, before referred to. The proper position of the disk 91 may be ascertained by noting the position of the pointer 77. After the said disk 91 has been set, it may be locked in such position by shifting the disk 82 to bring the bolt 81 into one of the recesses 92 of said disk 91.

The combination tumblers 86 and 95 are set as follows: In the present instance, there are six combination tumblers 86 having twelve digits to the combination number. These tumblers 86 are secured to sleeves 98 provided with disks 99. The disks 99 are provided with ratchets 100 which are in operative relation with spring-controlled pawls 101 mounted on disks 102 which are part of the spindles 103. The spindles 103 extend through the front plate 75 of the casing 74 and are provided with thumb knobs 104 by means of which said spindles 103 are rotated, as shown in Fig. 8. When the spindles 103 are rotated, the combination tumblers thereon will be rotated through the agency of the disks 102, pawls 101, ratchets 100, disks 99 and sleeves 98. The combination tumblers 95 are similarly rotated or set through the agency of ratchets 105, and spring-controlled pawls 106 secured to the disks 99. It is to be understood that the pawls 101 and 106 do not ride over their ratchets 100 and 105 during the setting of the combination, these ratchets and pawls being instrumental during the selecting of the combination. The disks 102 are provided with recesses 107 which receive the ends of spring-click pawls 108. The pawls 108 are instrumental in audibly indicating the extent of revolution imparted to the spindles 103 by the knobs 104. One of the recesses 107 in each of said disks 102 is deeper than the others in order to permit the normal position of the spindles 103 to be ascertained. The combination is set by rotating the spindles 103 a definite number of clicks from the normal position. When any one of the tumblers 86 or 95 has been properly set, its recess 88 will lie opposite its respective projection 87 of the disk 82. In selecting the combination numbers of the tumblers 86 and 95, the previous combination is first set and the tumblers 86 or 95 are locked by shifting the projections 87 into recesses 88 which locks the tumblers 86 or 95 against rotation. The combination numbers may then be selected by rotating the knobs 104, said knobs being rotated in one direction to select the combination for the set of tumblers 86 and in the other direction to select the combination for the set of tumblers 95. During this selection of the combination, the pawls 101 and 106 ride over the ratchets 100 and 105, thus permitting the relative position between the recesses 88 and the deeper notches 107 to be adjusted. To prevent the set combination being thrown out by unauthorized persons pressing the projections 87 of disk 82 against the tumblers 86 or 95, the arms 83 are made resilient to prevent sufficient pressure being exerted on said tumblers 86 or 95 to force the pawls 101 and 106 to ride over their ratchets by rotating the knobs 104. The casing 74 and face plate 75 are held together by pins 109 which are in operative relation with the combination tumblers 86 and 95. When the recesses 88 of the combination tumblers 86 and 95 lie opposite the pins 109, the casing 74 may be removed from the front plate 75. The combination number for unlocking the casing may be ascertained by adding to each digit of the combination number of the tumblers 86 and 95 one-half the number of the notches 107 in each disk 102, which in this case is twelve. When the car or automobile is placed out of operation, the drum 48 is returned to a normal position by rotating the thumb piece 78 backward to a position where the hand 77 indicates zero on the dial 76. A stop is provided to indicate this position which consists of a pin 110 mounted on the gear 52 and a pin 111 mounted on the frame 4, see Figs. 4 and 5, in which stop pin 111 appears in the path of pin 110. Just prior to the time that the drum 48 reaches its highest set, or sixty mile, position, the pawl 38 is released from engagement with the segment ratchet 37, Fig. 4, which permits the hand 36 which indicates the attained speed, to return to a zero position under the influence of the spring 112. The pawl 38 is disengaged from the ratchet 37 by a pin 113 mounted on a crank 114 attached to the shaft 53. The pin 113 is adapted to engage the extension 115 of the pawl 38.

The mechanism for the mileage indications shown in the front and rear elevations, Figs. 1 and 4, is not shown in detail but this consists of a well known dial form of adding mechanism which it has not been deemed necessary to illustrate. Provision is, however, made for the incorporation of these devices. Furthermore, I do not wish to be confined to the present illustration in the matter of effecting the electric circuit, as it is obvious that the brush 57, may be instrumental in interfering with any type of electric circuit to render the vehicle inoperative, whether driven by electric or gasolene motive power.

Having thus described the various mechanisms and functions of my invention, its operation is as follows. With the device mounted upon an automobile, for example, and the controlling mechanism resting in a locked position as shown in Fig. 9, Sheet 5, the operation preparatory to moving the vehicle consists of, first, setting the high and low speed combination tumblers 95 and 86 to their proper positions with the lugs 87 and notches 88 in alinement, second, shifting the locking bolt 81 out of engagement with disks 79 and 91 and then setting the indicating drum 48 to whatever position may be determined upon by turning the knob 78. From the drawings and description, it will be understood that the insulated pocket 56 will then have been advanced out of engagement and ahead of contact brush 57, thereby rendering the vehicle ready for use. If after setting said vehicle in operation, it should be desired to run at a higher speed than the indicating drum 48 had been set to, said drum would again have to be advanced in its position for the reason that were the speed to be increased without advancing the indicating drum, the contact brush 57 would overtake the insulated pocket 56, and through such engagement effect the sparking circuit, as heretofore shown and described. The vehicle would not be brought to a standstill position, however, as the force of its motion would carry it forward, while brush 57, under control of the fly-balls 17, would fall back out of engagement with insulated pocket 56, thereby permitting of another impulse of motive power. With both sets of combination tumblers set to their proper positions, and the locking bolt 81 withdrawn from engagement with disks 79 and 91, as mentioned in the starting operation, it is then within the power of the operator to set the indicator drum 48 to the full capacity of the controlling mechanism which, in the drawings, shows sixty miles an hour; but, if it be desired by anyone in authority that a lower rate of speed be maintained, the same would be accomplished by, first, setting the high speed combination tumblers 95 to their proper position, second, rotating the indicator drum 48 to whatever lower rate of speed may be determined upon and then shifting the locking bolt 81 into engagement with recess 92 in disk 91. By throwing out the combination of tumblers 95, the disk 91 will now be locked in this position. With disk 91 locked to a position of say, twenty miles an hour, it will be impossible to operate the vehicle at any higher rate of speed. If it should be desired to lock the vehicle in a standstill position, the combination tumblers 86 are first set, if not previously set, to their proper positions, the indicator drum 48 rotated back to zero, and the locking bolt 81 then shifted farther along the shaft 73 until said bolt also engages recess 80 in disk 79. By throwing out the combination of tumblers 86, the vehicle is then securely locked against movement, as the insulated pocket 56 will then have been rotated backward into engagement with contact brush 57, as described. If it should be the desire of the proprietor of an automobile equipped with my invention to keep in touch with the speed at which the car is being operated by his chauffeur or driver, while at the same time allowing him to have his own pleasure in the matter, the high speed indicating hand 36 may be locked against release by the same mechanism used in connection with the controlling disks 79 and 91, it only being necessary to set and lock disk 91 to its fifty-five mile position when this result will have been accomplished, for, with the disk 91 locked to a fifty-five mile position, the releasing pawl 38 cannot be reached by trip arm 114 and the chauffeur or driver is thus prevented from interfering with the evidence as produced by the high speed indicating hand 36. It will be understood, that in locking the high speed disk 91 to any desired position, ranging from five to fifty-five miles an hour, the operation of the vehicle at any speed below that to which it has been locked is in no way interfered with as the disk 91 is freely journaled upon shaft 73 which permits of said shaft 73 controlling the indicator drum 48 and disk 79, being rotated to and from a standstill position and up to whatever position the disk 91 has been set and locked to, said disk 91 when released by bolt 81 returning to a normal position under the influence of spring 94. Assuming, now, that in the interest of public safety it is required by law that all automobiles operating within the boundaries of the United States be equipped with a device such as has been described and that all operators thereof be required to keep their indicators set to a speed not to exceed the maximum rate as laid down by ordinance of the different localities, it will be seen that I have produced a cheap, simple and practical device, calculated to supply just such a want, and further, that with its general adoption the solution of the speed problem will have at last been solved.

From the description and drawings of my invention, it will be apparent that changes and modifications of the same may be made without departing from the objects and purposes thereof which are to provide means for regulating the speed of automobiles, motor-cycles, and the like. I, therefore, do not wish to be confined to the exact construction and arrangement of parts of the mechanism.

A feature of my invention which I wish to emphasize, and one that is in radical contrast with the ordinary speedometer now generally in use on automobiles, is the large and prominent clockfaced indicating dial directly in front of the vehicle with the figure indicating the speed limit in contrasting color. The familiarity of the public with the usual large clock dial found everywhere; in the church tower, the school house and in the home, has accustomed the public to read the indications thereof at long range, whereas the usual speedometer is subject only to close observation. And, furthermore, the speed limit indicator which is exhibited at the front and both sides of the instrument affords ready means for the ascertainment by the public and officers of the law whether the driver of a machine is obeying the law in the matter of setting the controlling mechanism to conform with an ordinance. The tell-tale high speed indicator unerringly points to whatever has been the highest speed attained. For example, were the driver of an automobile to enter any highway or thoroughfare having an ordinance limiting speed to say twenty miles an hour with the indicator set to twenty-five miles, such driver would be subject to apprehension and arrest. Knowing that such an infraction of the law would give the authorities the right to take control of the matter by either locking the high speed indicator hand against release or locking the machine down to such a speed limit as may in their judgment be proper, will have the effect of preventing the numerous casualties that are now taking place throughout the country due to reckless driving of automobiles.

Having described my invention, I claim:

1. In a mechanism of the character specified, the combination with a centrifugal device, a speed indicator connected therewith, a speed limit indicator, means for setting said speed limit indicator to a predetermined speed limit comprising a setting indicator and connections between said setting and speed limit indicators, and means controlled by said centrifugal device including an electric circuit whereby the vehicle is stopped when the speed thereof reaches that indicated by the speed limit indicator.

2. In a mechanism of the character specified, the combination with a centrifugal device, of a speed limit indicator connected therewith, means for setting said speed limit indicator at a predetermined speed limit comprising a setting indicator, means for imparting setting movement to said last named indicator, connections between said last named indicator and said speed limit indicator whereby the latter indicator is moved to a predetermined speed limit from the setting indicator, and permutation devices for locking said setting indicator and therewith the speed limit indicator in the position to which they are set.

3. In mechanism of the character specified, the combination of a centrifugal device, a speed limit indicator, means for setting and locking said indicator to a speed limit, a reciprocating member actuated from said centrifugal device, an oscillating member actuated from said reciprocating member, a hand actuated by said oscillating member and coöperating with said indicator, means for holding said hand in a position to indicate the higher speed, and means for releasing said hand-holding means to permit it to move from its indicating position.

4. In mechanism of the character specified, the combination of a speed limit indicator, means for setting said indicator to indicate the speed limit, means for locking said indicator in such set position, a centrifugal device driven from a moving vehicle, means actuated from said centrifugal device whereby the maximum speed indication is shown, means for locking said indicator in such position, and means for cutting off the motive power from said vehicle when the running speed of the vehicle approximates the speed to which the indicator is set.

5. In mechanism of the character described, a speed limit indicator, means for setting said indicator at a predetermined speed including a setting indicator, permutation devices for locking said setting and speed limit indicators in the positions to which they are set, centrifugal devices actuated from a moving vehicle, an electrical circuit, and means controlled by said centrifugal device for breaking said circuit when the speed of the vehicle attains that set by said speed limit indicator and whereby the vehicle is stopped.

6. In mechanism of the character specified, a speed limit indicator, means for setting said indicator at a predetermined speed, including a setting indicator and connections between said setting and speed limit indicators, permutation devices for locking said indicators when so set, an electrical circuit, means for breaking said circuit when the speed of the vehicle increases beyond that set by said indicator, a centrifugal device driven from said vehicle, and reciprocable devices controlled by said centrifugal device and in turn controlling the means for breaking said circuit, whereby the vehicle is checked when the speed thereof tends to exceed that of said indicator.

7. In mechanism of the character described, a speed indicator, a speed limit indicator, means for setting said speed limit indicator to a predetermined position, including a setting indicator and connections between said setting and speed limit indicators, permutation devices for locking said speed limit indicator and said setting indicator when in their set positions, an electric circuit, a centrifugal device controlled by the speed of the vehicle, means interposed between said centrifugal device and said speed indicator and said speed limit indicator whereby the speed of the vehicle is indicated, and means controlled by said centrifugal device for breaking the electric circuit when the speed of the vehicle tends to exceed that to which the speed limit indicator has been set 8. In mechanism of the character described, a speed limit indicator, means for setting said indicator to a predetermined speed, including a setting indicator and connections between said setting indicator and speed limit indicator, means for locking said setting indicator and said speed limit indicator when set to a speed limit, an electric circuit, a centrifugal device controlled by the speed of the vehicle, means actuated by said centrifugal device for moving an element of said speed indicator in accordance with the speed of the vehicle, means for locking the speed limit indicator when it is moved to a position to indicate the speed limit, and means controlled by said centrifugal device for breaking the circuit when the speed of the vehicle tends to exceed that to which said indicator has been set.

9. In mechanism of the character specified, a speed indicator, a speed limit indicator, means for setting said speed limit indicator to a predetermined position, including a setting indicator and connections between said setting and speed limit indicators, combination lock devices for locking said setting and speed limit indicators in their set positions, a centrifugal device controlled by the speed of the vehicle and in turn actuating the speed indicator to indicate the speed at which the vehicle is traveling, an electric circuit, contact devices controlling said circuit, and means interposed between said indicators and said contact devices, whereby said circuit is broken when the speed of the vehicle tends to exceed that to which said speed limit indicator has been set.

10. In mechanism of the character specified, a speed indicator and speed limit indicator, means for setting said speed limit indicator to a speed limit, including a setting indicator and connections between said setting and speed limit indicators, means for locking said indicator when so set, setting and speed limit indicators, centrifugal devices controlled by the speed of the vehicle, means controlled by said centrifugal devices and adapted to actuate the speed indicator to show the speed at which the vehicle is running, means for holding said indicator in the position in which it indicates the limit of speed to which the speed limit indicator is set, and means actuated by the indicator setting means to release said holding means and return said indicator to its normal position.

11. In mechanism of the character specified, a speed indicator, a speed limit indicator, a centrifugal device controlled by the speed of a moving vehicle, means actuated from said centrifugal device for actuating said speed indicator, and a connection between said speed indicator and said speed limit indicator whereby the said speed indicator is actuated from the movement of said speed limit indicator, and means for locking the speed limit indicator to the highest position to which it has been moved.

12. In mechanism of the character specified, a speed indicator and a speed limit indicator, means for setting said speed limit indicator to a position to indicate a limit of speed, said means including a setting indicator and connections between said setting and speed limit indicators, means for locking said setting and speed limit indicators when so set, centrifugal devices controlled by the speed of a moving vehicle, means controlled by said centrifugal devices and adapted to actuate the speed indicator to show the speed at which the vehicle is running, means for holding said indicator in the position in which it indicates the limit of speed to which the speed limit indicator is set, and means actuated by the indicator-setting means to release said holding means and return said indicator to its normal position.

13. In mechanism of the character specified, centrifugal devices controlled by a moving vehicle, a speed limit indicator and a brush actuated by said centrifugal devices, an electric circuit including a collector ring having an insulated part, means for setting said indicator to a predetermined speed limit and said collector ring to a predetermined position, means for locking said indicator and said collector ring in the set positions, and a contact member controlled by said centrifugal device and adapted to engage the insulated part of said collector ring whereby the circuit is broken when the speed of the vehicle reaches that to which said indicator was set.

14. In mechanism of the character described, centrifugal devices controlled by the motion of a vehicle, a high speed indicator actuated thereby, an electric circuit having a non-conducting point, setting mechanism for moving said indicator to a position to indicate a limit of speed for the vehicle, said setting mechanism being also adapted to shift the non-conducting point of said circuit relative to the limit of speed in which said indicator is set, means for locking said high speed indicator in the position in which it is moved when the vehicle attains its highest speed, means for locking the non-conducting point of said circuit in its set position, a contact brush, and means actuated by said centrifugal device whereby said brush is moved in contact with the non-conducting point of said circuit whereby the circuit is broken.

15. In mechanism of the character specified, a speedometer indicator, a speed limit indicator, an electric circuit including a collector ring having an insulated part, setting mechanism adapted to move said speed limit indicator to a position to indicate the speed to which the vehicle is limited, said setting mechanism being also adapted to move said collector ring to a predetermined position, a centrifugal device controlled by the speed of the vehicle, means actuated from said centrifugal member to point to the speedometer indications, means actuated by said speedometer indicating means to point to the speed limit indication, and a contact brush actuated from said speedometer indicating means and engaging the insulated part of said collector ring to break the circuit when the speed limit is reached.

16. In mechanism of the character specified, a high speed indicator, a centrifugal device controlled by a moving vehicle, means actuated by said centrifugal device for imparting movement to said high speed indicator, a speed limit setting mechanism by which said speed limit indicator is moved to a selected position, locking members including a bolt and peripherally recessed disks adapted to lock the vehicle in a stationary position and the speed limit indicator in its set position, and permutation devices controlling said locking members.

17. In mechanism of the character specified, a speed limit indicator, a centrifugal device controlled by the speed of a moving vehicle, means for setting said indicator to a predetermined speed limit, locking members including a bolt and peripherally recessed disks adapted to lock the said indicator in its set position and the vehicle in a stopped position, and a plurality of series of permutation devices one of such devices of each series controlling the locking member for the vehicle and the other of such devices of each series controlling the locking member for the indicator.

18. In mechanism of the character specified, a speedometer indicator, a speed limit indicator, centrifugal devices controlled by the moving vehicle, reciprocating devices controlled by said centrifugal devices, and imparting movement to said speedometer indicator, and oscillating devices actuated by said centrifugal indicator devices and imparting movement to said speedometer indicator.

19. In mechanism of the character specified, a speed limit indicator, means for setting said indicator to a predetermined position, means for locking said indicator in such position having two locking positions, and a plurality of series of permutation devices controlling said locking means in either of said positions.

20. In mechanism of the character specified, a speed limit indicator, an electric circuit including a collector ring having an insulated part, means for setting said indicator to a predetermined speed limit and for shifting said collector ring, locking members including a bolt adapted to lock said setting means in the position to which it was moved in setting said indicator and the collector ring.

21. In mechanism of the character specified, the combination with a speed limit indicator, means for setting said speed limit indicator to a predetermined speed limit indication, means for imparting movement to said indicator, means for locking said setting means in the position to which is was moved in setting said indicator, said locking means comprising locking members, a longitudinal bolt movable in and out of locking position with either or both of said locking members, and two series of permutation tumblers one of said series controlling said bolt relative to one of said locking members and the other of said series controlling said bolt relative to the other locking member.

22. In mechanism of the character specified, a speed limit indicator, means for setting said indicator to a predetermined speed indication, including a spindle, a speed limit interlocking member on said spindle, a vehicle locking-out member on said spindle, a bolt shiftable on said spindle to positions to interlock with said interlocking members on said spindle, and a plurality of series of permutation devices, one permutation device of each series being adapted to lock said bolt in engagement with both of said interlocking members, and another permutation device of each series being adapted to lock said bolt in engagement with one only of said interlocking members.

23. In mechanism of the character specified, a speed limit indicator, means for setting said indicator to a predetermined limit at which a vehicle shall run, means for imparting movement to said indicator, locking members including a disk adapted to lock the vehicle in a stationary position, and a disk adapted to lock the indicator in its set position, a bolt adapted to lock one or both of said disks, and a plurality of sets of tumblers controlling said bolt, each set of tumblers including a single spindle, and each set being adapted to form two combinations through the movements of its respective spindle.

24. In mechanism of the character described, a casing, a clockfaced dial containing high speed indications, an indicator associated therewith and adapted to be set to a position to indicate a limit of speed in contrasting color at the face of the said dial and at the sides of the casing, means including an auxiliary indicator for setting said speed limit indicator to exhibit the speed limit indicator, and means actuated from a moving vehicle and adapted to actuate the high speed indicator hand whereby the said hand will point to the indications on the dial, one of which corresponds to the limit of speed indicated by speed limit indicator.

In testimony whereof I affix my signature.

THOMAS A. SAMMONS.